United States Patent Office 3,351,565
Patented Nov. 7, 1967

3,351,565
CATALYST FOR THE PREPARATION OF DI-
CARBOXYLIC ACID ANHYDRIDES
Ralph O. Kerr, Houston, Tex., assignor to Petro-Tex
Chemical Corporation, Houston, Tex., a corporation of
Delaware
No Drawing. Original application Apr. 19, 1963, Ser. No.
274,302, now Patent No. 3,255,211, dated July 7, 1966.
Divided and this application Oct. 21, 1965, Ser. No.
510,433
3 Claims. (Cl. 252—437)

This is a division of application Ser. No. 274,302, filed Apr. 19, 1963, now U.S. Patent No. 3,255,211.

This invention relates to an improved process for the manufacture of dicarboxylic acid anhydrides by catalytic oxidation of ethylenically unsaturated hydrocarbons and relates more particularly to an improved process for producing monoethylenically unsaturated aliphatic dicarboxylic acid anhydrides such as maleic anhydride by reacting a mixture of an oxygen-containing gas and an ethylenically unsaturated hydrocarbon in vapor phase in the presence of a novel catalyst thereof.

Production of dicarboxylic acid anhydrides by vapor phase catalytic oxidation of hydrocarbons is well known. The principal method currently employed for making maleic anhydride is by the catalytic oxidation of benzene in the presence of certain heavy metal oxide catalysts. However, it would be desirable to be able to produce maleic anhydride from the readily available aliphatic hydrocarbons such as butene. Although processes for the oxidation of unsaturated aliphatic hydrocarbons are reported in the literature, there are certain defects of these processes such as short catalyst life and low yields of product. More efficient catalysts for the conversion of the hydrocarbons to maleic anhydride are desirable.

In copending applications I have described improved catalysts for the production of maleic anhydride from olefins. These catalysts comprise vanadium and phosphorus in particular ratios combined as a complex. The processes using the vanadium-phosphorus catalysts provide high yields of maleic anhydride as well as other advantages. However, still further improved catalysts and processes are desired. One objective is to increase the life of these catalysts. We have found that the vanadium-phosphorus catalysts are particularly susceptible to deactivation when the catalysts are subjected to high temperatures. However, in order to achieve high yields of product, it is often necessary to conduct the oxidation at high temperatures. Consequently, it would be an advantage to have a catalyst which would produce high yields at a relatively low temperature of the catalyst. By operating at a lower temperature the life of the catalyst would be prolonged.

Another advantage of operating at a low temperature would be the possibility that the quantity of undesirable by-products, such as carbon monoxide and carbon dioxide, would be reduced. Still another advantage of the lower temperature process would be that the process would be cheaper and easier to control because of the lower temperatures involved. A very important advantage of a low temperature process is that high flow rates of feed may be processed without deactivating the catalyst. Thus, the catalyst would have a longer catalyst life as well as having a higher production rate during the life of the catalyst.

It is accordingly an object of this invention to provide an improved process for obtaining high yields of dicarboxylic acid anhydrides by vapor phase oxidation of olefins. It is another object of this invention to provide an improved process for the vapor phase oxidation of monoolefins, particularly butene-2 to maleic anhydride. It is a further object of this invention to provide a novel and improved catalyst useful in obtaining increased yield of product by vapor phase catalytic oxidation of olefins to aliphatic dicarboxylic acid anhydrides, and a method for making the same. Another object is to provide a process for the oxidation of aliphatic hydrocarbons to maleic anhydride at a lower operating optimum temperature. An additional object is to provide a process which will produce acid anhydrides at high flow rates of aliphatic hydrocarbon through the reaction zone. Still another object is to produce catalysts of long life. Other objects and advantages of the invention will be apparent from the description thereof which follows.

It has now been found that these objectives may be accomplished by the use of a particular vanadium-oxygen-phosphorus complex type catalyst containing a minor amount of niobium. The catalysts contain vanadium, phosphorus, niobium and oxygen chemically bonded together as a complex. The atomic ratio of the phosphorus, vanadium and niobium should be present in relative proportions of about 1 atom of vanadium to about 1.1 to 1.8 or 2.5 atoms of phosphorus to about 0.005 to 0.3 atoms of niobium. The preferred proportions are from about 1.0 atom of vanadium to 1.2 to 1.6 atoms of phosphorus to about 0.01 to 0.20 atom of niobium. The atomic ratio of oxygen to the remaining components of the catalyst, when the catalyst is being used to catalyze the oxidation, is difficult to determine and is probably not constant due to the competing reactions of oxidation and reduction taking place during the reaction at the high temperatures.

The catalysts containing vanadium, phosphorus and niobium will preferably also contain an additional component. The additional component will be an element or compound thereof of Group Ia metals of the Periodic Table.[1] The group Ia metal elements are the alkali metals including lithium, sodium, potassium, rubidium, cesium and francium. The function of the Group Ia element is not completely understood but superior results are obtained when the catalysts contain these elements. One advantage is the life of the catalysts is increased with this increased life being due at least partially to the stabilizing effect of the alkali on the phosphorus and niobium.

The atomic ratio of the total atoms of Group Ia elements to phosphorus should be between about 0.003 and 0.2 atom of Group Ia elements per atom of phosphorus. The best results have been obtained when the ratio of Group Ia atoms to phosphorus atoms has been from about 0.01 to 0.06 or 0.1 atom of elements of Group Ia per atom of phosphorus. When the Group Ia atom is introduced into the catalyst preparation in the form of a compound, for example, as lithium hydroxide or potassium chloride, the weight of the Group Ia metal compound will ordinarily be from about 0.05 to about 5.0 weight percent of the total weight of the vanadium, phosphorus and oxygen and niobium.

The catalyst are formed by a method wherein the vanadium is present as a cation having an average valence of less than 4.6 in the composition which is deposited on the carrier. Catalysts may be prepared by reacting phosphorus atoms, wherein the phosphorus atoms are present in an anion such as the $PO_4^{-3}$ phosphate anion, with a vanadium compound of a valence of less than 4.6 such as vanadyl chloride, or by initially using a vanadium compound with a valence of plus 5 such as $V_2O_5$ and thereafter reducing to the lower valence with, for example, hydrochloric acid during the catalyst preparation to form the vanadium oxysalt, vanadyl chloride, in situ. The vanadium compound may be dissolved in a reducing solvent which sol-

[1] These groups are based on the long form of the periodic classification of the elements as found in Smith's Introductory College Chemistry, 3rd edition, by William F. Ehret (Appleton-Century-Crofts, Inc., 1950).

vent functions not only to form a solvent for the reaction, but also to reduce the valence of the vanadium compound to a valence of less than 5. For example, a vanadium compound, phosphorus compound and niobium compound may be dissolved in any order in a suitable reducing solvent and the formation of the complex allowed to take place. Preferably the vanadium compound is first dissolved in the solvent and thereafter the phosphorus and niobium compounds are added. The reaction to form the complex may be accelerated by the application of heat. The deep blue color of the solution shows the vanadium has an average valence of less than 5. The complex formed is then, without a precipitation step, deposited as a solution onto a carrier and dried. In this preferred procedure, the vanadium has an average valence of less than plus 5 at the time it is deposited onto the carrier. Generally, the average valence of the vanadium will be between about plus 2.5 and 4.6 at the time of deposition onto the carrier, and perferably will be between 3.0 and 4.3.

When the above described preferred solution method is employed, reducing agents for the vanadium may be either organic or inorganic. Acids such as hydrochloric, hydroiodic, hydrobromic, acetic, oxalic, malic, citric, formic and mixtures thereof such as a mixture of hydrochloric and oxalic acid may be used. Sulphur dioxide may be used. Less desirably, sulfuric and hydrofluoric acids may be employed. Other reducing agents which may be employed, but which have not given as desirable catalysts are organic aldehydes such as formaldehyde and acetaldehyde; alcohols such as pentaerythritol, diacetone alcohol and diethanol amine, and additional reducing agents such as hydroxyl amines, hydrazine, and nitric oxide. The reducing agents will preferably have from one to 6 carbon atoms and be aliphatic. The solvent may be such as oxalic acid dissolved in water or alcohol. Nitric acid and similar oxidizing acids which would oxidize the vanadium from a valence of 4 to 5 during the preparation of the catalyst should be avoided. The reducing agents may form oxysalts of vanadium. For example, if $V_2O_5$ is dissolved in hydrochloric or oxalic acid, the corresponding vanadium oxysalts are produced. These vanadium oxysalts should have as the salt forming anion an anion which is more volatile than the phosphate anion.

The time at which the niobium compound and alkali compound, if included, is incorporated into the solution is not critical so long as it is in solution before the catalyst complex is coated onto the carrier. The niobium and alkali compounds may be added after the vanadium compound and the phosphorus compound have been reacted or the niobium and alkali compounds may be added either before, at the same time, or after either the vanadium or phosphorus compounds has been added. The alkali compound and niobium do not have to be added at the same time. Heat may be applied to accelerate the formation of the complex and one method of forming the complex is by causing the ingredients to react under reflux conditions. Under reflux conditions this solution reaction generally takes about one to two hours.

Any vanadium, phosphorus and niobium compounds may be used as starting materials which when the precursor compounds are combined according to the prescribed process and heated to dryness in air at a temperature of, for example, 350° C. will leave as a deposit a catalyst complex having relative atomic proportions within the above described ranges. Preferred are vanadium, phosphorus and niobium compounds which are essentially completely soluble under standard conditions of 760 mm. of mercury in boiling aqueous hydrochloric acid, containing 37 weight percent hydrogen chloride. Generally, phosphorus compounds are used which have as the cation an ion which is more volatile than the phosphate anion. Various compounds may be used, such as metaphosphoric acid, triphosphoric acid, pyrophosphoric acid, ortho-phosphoric acid, phosphorus pentoxide, phosphorus oxyiodide, ethyl phosphate, methyl phosphate, amine phosphate, phosphorus pentachloride, phosphorus trichloride, phosphorus oxybromide, and the like.

Suitable vanadium compounds useful as starting materials are compounds such as vanadium pentoxide, ammonium metavanadate, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, and the like. Generally, any vanadium compound which has an anion which is either the phosphate anion or is more volatile than the phosphate anion is satisfactory.

Suitable niobium compounds are the various compounds such as the niobium halides, phosphates, oxides, carbonates, sulfates, nitrates, acetates, and so forth. Generally niobium compounds are used which either have the phosphate anion as the anion or which have an anion which is more volatile than the phosphate anion. Compounds such as niobium dioxide, niobium pentoxide, niobium oxychloride, niobium oxylate, and the like, are useful as starting materials. Mixtures of the various vanadium, phosphorus and niobium compounds may be used as starting materials to form the described catalyst complex.

The alkali metal may suitably be introduced by employing alkali metal compounds such as alkali metal salts with examples being lithium acetate, lithium bromide, lithium carbonate, lithium chloride, lithium hydroxide, lithium iodide, lithium oxide, lithium sulfate, lithium orthophosphate, lithium meta-vanadate, potassium sulfate, potassium chloride, potassium hydroxide, sodium chloride, sodium hydroxide, rubidium nitrate, cesium chloride and the like. Mixtures of two or more alkali metal compounds may be used, such as a mixture of lithium hydroxide and sodium chloride or a mixture of lithium chloride and potassium chloride. The preferred alkali metal elements are lithium, sodium and potassium, and mixtures thereof, with lithium being particularly preferred. The alkali metal compound will preferably be an alkali metal compound which either has a phosphate anion as the anion, that is a compound such as lithium phosphate, or a compound which has an anion which is more volatile than the phosphate anion.

Inert diluents such as silica may be present in the catalyst, but the combined weight of the vanadium, oxygen, phosphorus, niobium, and alkali metal if employed, should preferably constitute at least about 50 weight percent of the catalyst surface exposed to the reaction gases, and preferably these components constitute at least about 75 weight percent of the catalyst surface and more preferably at least about 95 weight percent.

Before the catalyst solution is combined with the carrier the solution of catalyst is preferably concentrated to a solution which contains from about 30 to 80 percent volatiles, and better results have been obtained when there is from about 50 to 70 percent volatiles by weight. The carrier may be added to the catalyst solution or dispersion or the catalyst solution or dispersion may be poured onto the carrier. Less desirably, the Alundum or other carrier may be present during the whole course of reactions to provide the desired vanadium-oxygen-phosphorus-niobium complex. After the catalyst complex has been coated onto the carrier, the vanadium may be converted to a more active form by heating in the presence of an oxidizing gas.

The support or carrier for the vanadium-oxygen-phosphorus-niobium complex should preferably be inert to both the depositing solution containing the complex and preferably should be inert under the catalytic oxidation conditions. The support provides not only the required surface for the catalyst, but gives physical strength and stability to the catalyst material. The carrier or support normally has a low surface area, as usually measured, from about 0.001 to about 5 square meters per gram. A desirable form of carrier is one which has a dense nonabsorbing center and a rough enough surface to aid in retaining the catalyst adhered thereto during handling and under reaction conditions. The carrier may vary in size but preferably is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor. Very useful carriers are Alundum and silicon carbide or Carborundum. Any of the Alundums or other inert alumina carriers of low surface may be used. Likewise, a variety of silicon carbides may be employed. Silica gel may be used. The amount of the catalyst complex on the carrier is usually in the range of from about 10 to about 30 weight percent of the total weight of complex plus carrier and more preferably from about 14 to about 24 weight percent on an inert carrier such as alundum. The amount of the catalyst complex deposited on the carrier should be enough to substantially coat the surface of the carrier and this normally is obtained with the ranges set forth above. With more absorbent carriers, larger amounts of material will be required to obtain essentially complete coverage of the carrier. Excess catalyst over that required to coat the carrier surface is not necessary and usually will be lost by mechanical attrition. The final particle size of the catalyst particles which are coated on a carrier will also preferably be about 2½ to about 10 mesh size. The carriers may be of a variety of shapes, the preferred shape of the carriers is in the shape of cylinders or spheres. Although more economical use of the catalyst on a carrier in fixed beds is obtained, the catalyst may be employed in fluid bed systems. Of course, the particle size of the catalyst used in fluidized beds is quite small, varying from about 10 to about 150 microns and in such systems the catalyst normally will not be provided with a carrier but will be formed into the desired particle size after drying from solution. Therefore, the particle size may suitably range from about 10 microns to about ¼ inch or longer in the greatest dimension.

Prior to use, the catalytic material may be placed in the reactor used to convert an olefin such as butene-2 to maleic anhydride and may, for example, be conditioned by passing butene-2 in a low concentration of butene-2 in air over the catalyst. In a typical, but non-limiting, example the temperature may be slowly raised over a period of 72 hours, to about 350° C. to 550° C. Thereafter, butene-2 in air may be passed over the catalyst, for example, at a concentration of about 1.2 mole percent butene-2 at the rate of 100 grams butene-2 per liter of catalyst per hour and the maleic anhydride product collected from the gaseous effluent from the reactor. Of course, the maleic anhydride produced may be collected beginning at the start of the conditioning period if desired. The reaction requires only passing the olefin in low concentrations in air over the described catalyst.

The flow rate of the gaseous stream through the reactor may be varied within rather wide limits, but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 2 seconds, more preferably less than about 0.5 second. The residence time is the calculated dwell time in the reactor space, with the reactor space 10 being defined as the void space portion of the reactor containing catalyst at a temperature of at least 350° C.

A variety of reactors will be found to be useful such as multiple tube heat exchanger type reactors or fluid bed reactors. If a tubular reactor is employed, the tubes of such reactors may conveniently vary in diameter from about ¼ inch to about 3 inches, and the length may be varied from about 3 to about 10 or more feet. The oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. As will be recognized by the man skilled in the art, the heat exchange medium will be kept at the proper temperature by heat exchangers and the like. The reactor or reaction tubes may be iron, stainless steel, carbon-steel, nickel, glass tubes such as Vycor and the like. Both carbon-steel and nickel tubes have excellent long life under the conditions of the reactions described herein. Normally, the reactors contain a preheat zone of an inert material such as ¼ inch Alundum pellets, inert ceramic balls, metal balls or chips and the like. Conveniently the preheat zone will comprise about one-half to one-fourth the volume of the active catalyst present, although it is not essential to have any preheat zone.

The temperature of reaction may be varied within some limits, but normally the reaction should be conducted at temperatures within a certain range. The oxidation reaction is exothermic and once reaction is underway, the main purpose of the salt bath or other media is to conduct heat away from the walls of the reactor and control the reaction. Better operations are normally obtained when the reaction temperature employed is no greater than about 100° C. above the salt bath temperature, under a given set of conditions. The temperature in the reactor, of course, will also depend to some extent upon the size of the reactor and the olefin concentration. Under usual operating conditions, in compliance with the preferred procedure of this invention, the temperature in the center of the reactor, measured by thermocouple, is about 375° C. to about 550° C. The range of temperature preferably employed in the reactor, measured as above, should be from about 400° C. to about 515° C. and the best results are ordinarily obtained at temperatures from about 420° C. to about 500° C. Described another way, in terms of salt bath reactors with carbon steel reactor tubes, about 1.0 inch in diameter, the salt bath temperature should be controlled between about 350° C. to about 550° C. Under normal conditions, the temperature in the reactor ordinarily should not be allowed to go above about 550° C. for extended lengths of time because of decreased yields and possible deactivation of the novel catalyst of this invention.

The pressure on the reactor is not generally critical, and the reaction may be conducted at atmospheric, superatmospheric or below atmospheric pressure, and conveniently will be at about atmospheric pressure.

The catalyst of the present invention and the process of using them are useful for the production of aliphatic dicarboxylic acid anhydrides from aliphatic hydrocarbons. Ethylenically unsaturated hydrocarbons of from 4 to 6 carbon atoms such as 3-methylbutene-1, isoprene, 2,3-dimethyl butadiene are useful starting materials. The preferred starting materials are the four carbon hydrocarbons such as butene-1, cis or trans butene-2 and butadiene-1,3 and mixtures thereof. Useful feeds as starting materials may be mixed hydrocarbon streams such as refinery streams. For example, the feed material may be the olefin containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly $C_4$ hydrocarbon stream may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Although various mixtures of hydrocarbons are useful, the preferred hydrocarbon feed contains at least 70 weight percent butene-1, butene-2 and/or butadiene-1,3 and mixtures thereof, and more preferably contains at least 95 percent butene-1, butene-2, and/or butadiene-1,3 and mixtures thereof. Any remainder will be aliphatic hydrocarbons.

The gaseous feed stream to the oxidation reactors normally will contain air and about 0.5 to about 2.5 mole percent aliphatic hydrocarbons such as butene. About 1.0 to about 1.5 mole percent of the monoolefin are satisfactory for optimum yield of product for the process of this invention, although higher concentrations may be employed. The source of the oxygen may be pure oxygen or synthetic or natural mixtures of oxygen and inert gases such as nitrogen or helium may be used. Dry air is entirely satisfactory.

The dicarboxylic acid anhydrides may be recovered by a number of ways well known to those skilled in the art. For example, the recovery may be by direct condensation or by absorption in suitable media, with subsequent separation and purification of the dicarboxylic acid anhydride.

The maleic anhydride product has many well known commercial uses such as a modifier for alkyd resins.

In the following examples a quantity of 6 mm. x 6 mm. Vycor Raschig rings equivalent to about ¼ to ⅓ of the volume of the catalyst particles was loaded into the reactor on top of the catalyst particles (at the reactor inlet) to act as an inert preheat zone. The amount of catalyst composition coated on the carrier amounted to about 20 weight percent of the total weight of catalyst and carrier. In all of the examples, the percent of the niobium compound is based on the total weight of $V_2O_5$ and $P_2O_5$ (or equivalent $H_3PO_4$) used. The hydrocarbon feed in all of the examples contained approximately 97 mole percent butene-2 with the remainder being $C_3$ to $C_5$ hydrocarbon impurities. Except where otherwise noted the carrier particles used were inert alumina ⅛ x ⅛ inch cylindrical Alundum which had been washed with hydrochloric acid. The yields of maleic anhydride are calculated on the weight percent of maleic anhydride formed based on the weight of hydrocarbon fed. Yield values noted represent yields after the yield values had leveled out following the activation period. In all of the examples the butene concentration is based on the combined moles of air and butene.

The examples are only illustrative and are not intended to limit the invention.

*Example 1*

59.5 g. of vanadium pentoxide was added to 7 mols of hydrochloric acid (as a 37 weight percent hydrochloric acid aqueous solution) at room temperature. The mixture was refluxed slowly for about 24 hours. A blue solution was obtained, showing that the vanadium had an average valence of less than plus 5. 2.4 g. of $Nb_2O_5$ was added, and the solution was refluxed for four hours. The solution was cooled to about 40° C. and 60.5 g. of $P_2O_5$ was cautiously added to the solution and the mixture was again refluxed for about 24 hours. The resulting deep blue solution was evaporated to about 250 ml. and the solution was deposited onto 480 g. of hydrochloric acid extracted ⅛ inch x ⅛ inch cylindrical Alundum pellets. The carrier particles coated with the complex were then dried at low temperatures to remove the volatiles. A free flowing catalytic material was obtained which had the catalyst complex uniformly deposited on the surface of the Alundum particles. The catalyst particles were then heated at 300° C. in air for a period of about one hour, with the time of heat up to 300° C. being about four hours. The coated Alundum contained 20 weight percent of the catalyst complex based on the weight of the carrier plus complex. The complex which was coated on the carrier had an atomic ratio of 1.0 vanadium, 1.3 phosphorus and 0.0275 niobium.

300 ml. of the catalyst were loaded into the bottom of a 3 foot long, ¾ inch I.D. nickel reactor tube surrounded by a salt bath. On top of the catalyst was loaded 100 ml. of ⅛ x ⅛ inch cylindrical Alundum alumina pellets to form a preheat zone. A hydrocarbon mixture containing 95 to 97 mole percent butene-2 together with the remainder being $C_3$ to $C_5$ hydrocarbon impurities was mixed with air to give a mixture containing about 0.7–0.75 mole percent butene-2. The mixture of butene and air was fed into the top of the reactor at a rate of 80 grams of butene per liter of catalyst per hour. At a salt bath temperature of 406° C. and a maximum temperature in the reactor of 440° C. the optimum yield of maleic anhydride of 88 weight percent based on the weight of hydrocarbon fed was obtained. The maleic anhydride was recovered by bubbling the gaseous stream through water to form maleic acid which was dehydrated to maleic anhydride. The catalyst produced maleic anhydride at high yields for a prolonged period.

*Example 2*

The general procedure of catalyst preparation and oxidation to maleic anhydride followed in Example 1 was repeated. The catalyst had an atomic ratio of 1.35 phosphorus, 1.0 vanadium and 0.07 niobium. A 3 feet long, ¾ inch I.D. nickel tube reactor was used and was loaded with 300 ml. of the catalyst. 0.84 mol percent butene-2 in air mixture was fed through the reactor at a rate of 80 grams of butene per liter of catalyst per hour. The yield of maleic anhydride was 82 weight percent based on the butene fed. The salt bath temperature was less than 440° C.

*Example 3*

The general procedure of Example 1 was repeated with a catalyst having an atomic ratio of 1.0 vanadium, 1.50 phosphorus, 0.074 niobium and 0.24 lithium. The catalyst was prepared by first dissolving 55.3 g. of $V_2O_5$ in 7 moles of hydrochloric acid (as a 37 weight percent solution in water).

The solution was refluxed as in Example 1. The niobium was then added to the solution as 6.0 g. of $Nb_2O_5$ and the lithium was added as 5.28 g. of $Li_2CO_3$. After cooling 105 g. of 85 weight percent $H_3PO_4$ in water (equivalent to 64.7 g. $P_2O_5$) was added. The solution was then evaporated and deposited on the carrier particles. The solution had a valence of less than 4.6 at the time of deposition. The evaluation of the catalyst according to the procedure of Example 1 demonstrated a low temperature catalyst which had good life. The yield of maleic anhydride was in excess of 77 weight percent. The maximum temperature in the reactor was less than about 450° C.

The preferred catalysts are compositions having the prescribed ratios of vanadium, phosphate, niobium and alkali if employed, wherein the catalytic composition is deposited on a carrier with the vanadium being substantially in the form of a vanadyl phosphate. The average valence of the vanadium in the vanadyl radical will be less than plus 4.6. The vanadyl phosphate may be such as vanadyl orthophosphate, vanadyl hydrogen phosphate, vanadyl dihydrogen phosphate, hydrates thereof, and mixtures thereof. In these catalysts the vanadium should preferably be substantially or completely in the form of a vanadyl phosphate wherein the vanadium has an average valence of no greater than 4.3, such as about 4, at the time the catalytic composition is deposited on the carrier. The excess phosphorus, that is the phosphorus which is not combined as the vanadyl phosphate may or may not be combined with the niobium in this composition prior to deposition on the carrier.

What is claimed is:

1. A catalyst useful for the oxidation of aliphatic hydrocarbons to dicarboxylic acid anhydrides which comprises a catalytic composition of vanadium, phosphorus and niobium deposited on a carrier in an atomic ratio of about 1.1 to 1.8 atoms of phosphorus per atom of vanadium and about 0.005 to 0.3 atom of niobium per atom of vanadium, said catalyst having been prepared by depositing on the carrier a solution of the said catalytic composition wherein the vanadium has an average valence of no greater than 4.6 at the time of the deposition of the catalytic composition on the carrier, and thereafter drying the catalytic composition on the carrier.

2. A catalyst useful for the oxidation of aliphatic hydrocarbons to dicarboxylic acid anhydrides which comprises a catalytic composition of vanadium, phosphorus, niobium and a metal of Group Ia of the Periodic Table deposited on a carrier in an atomic ratio of 1.1 to 1.8 atoms of phosphorus per atom of vanadium, 0.005 to 0.3 atom of niobium per atom of vanadium and from 0.003 to 0.2 atom of a metal of Group Ia per atom of phosphorus, the said catalyst having been prepared by depositing on the carrier the catalytic composition wherein the vanadium is a cation and has an average valence of less than 4.6 at the time of the deposition of the catalytic composition on the carrier, and thereafter drying the catalytic composition on the carrier.

3. A catalyst useful for the oxidation of aliphatic hydrocarbons to dicarboxylic acid anhydrides which comprises a catalytic composition of vanadium, phosphorus and niobium deposited on a carrier in an atomic ratio of about 1.1 to 1.8 atoms of phosphorus per atom of vanadium and about 0.005 to 0.3 atom of niobium per atom of vanadium, said catalyst having been prepared by depositing on the carrier a composition comprising vanadyl phosphate wherein the vanadium has an average valence of less than 4.6 at the time of the deposition of the vanadyl phosphate on the carrier and thereafter drying the catalytic composition on the carrier.

References Cited

UNITED STATES PATENTS

| | | | |
|---|---|---|---|
| 1,975,476 | 10/1934 | Pier et al. | 252—456 |
| 2,625,554 | 1/1953 | Darby | 252—456 |
| 3,211,671 | 10/1965 | Egbert | 252—437 |
| 3,238,254 | 3/1966 | Kerr | 252—437 |

DANIEL E. WYMAN, *Primary Examiner.*

C. F. DEES, *Assistant Examiner.*